(12) United States Patent
Canedo et al.

(10) Patent No.: US 11,916,857 B2
(45) Date of Patent: Feb. 27, 2024

(54) HYPERLINK MESSAGES FOR MACHINE-TO-MACHINE COMMUNICATION ON A MACHINE SOCIAL MEDIA PLATFORM

(71) Applicant: Siemens Aktiengesellschaft, Munich (DE)

(72) Inventors: Arquimedes Martinez Canedo, Plainsboro, NJ (US); Lingyun Wang, Princeton, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/041,553

(22) PCT Filed: Aug. 11, 2021

(86) PCT No.: PCT/US2021/045518
§ 371 (c)(1),
(2) Date: Feb. 14, 2023

(87) PCT Pub. No.: WO2022/046410
PCT Pub. Date: Mar. 3, 2022

(65) Prior Publication Data
US 2024/0015122 A1    Jan. 11, 2024

Related U.S. Application Data

(60) Provisional application No. 63/071,386, filed on Aug. 28, 2020.

(51) Int. Cl.
*H04L 51/18* (2022.01)
*H04L 51/52* (2022.01)

(52) U.S. Cl.
CPC ........... *H04L 51/18* (2013.01); *H04L 51/52* (2022.05)

(58) Field of Classification Search
CPC ................... H04L 51/18; H04L 51/52
See application file for complete search history.

(56) References Cited

U.S. PATENT DOCUMENTS

| 2014/0244770 | A1  | 8/2014  | Kim et al.                |
|--------------|-----|---------|---------------------------|
| 2017/0155607 | A1* | 6/2017  | Chakra ............ G06F 40/30 |
| 2017/0351385 | A1* | 12/2017 | Ertmann .......... G06Q 10/107 |
| 2018/0150525 | A1* | 5/2018  | Daniel .......... G06F 16/24575 |
| 2018/0183619 | A1* | 6/2018  | Jayaram .......... H04W 4/12 |
| 2023/0126465 | A1* | 4/2023  | Pulitzer .......... G06F 16/40 235/379 |

FOREIGN PATENT DOCUMENTS

WO     2007052285 A2    5/2007

* cited by examiner

*Primary Examiner* — Nicholas R Taylor
*Assistant Examiner* — Tania M Pena-Santana

(57) ABSTRACT

A hyperlink message for machine-to-machine (M2M) or machine-to-human (M2H) communication has a semantic metadata tag, a content field, an executable specification field. Executable specification instructs a machine to perform a task associated with the machine related data, and post to a machine social media platform results of the task as content for the hyperlink message. The hyperlink message posting is visible and available to other participating machines on the machine social media platform to read and contribute related content as a hyperlink discussion of M2M or M2H communication.

15 Claims, 6 Drawing Sheets

HYPERLINK MESSAGES FOR MACHINE-TO-MACHINE COMMUNICATION ON A MACHINE SOCIAL MEDIA PLATFORM

TECHNICAL FIELD

This application relates to machine-to-machine (M2M) communication. More particularly, this application relates to hyperlinked M2M communication with dynamic semantic content, and extends to machine-to-human (M2H) communication.

BACKGROUND

Up until now, M2M communication has been solved with protocols such as OPC-UA where the data exchange is coupled with its semantics. This form of semantics is user-defined and establishes the meaning of the data that is being exchanged. For example, a data link between a temperature sensor and a programmable logic controller (PLC) that exchanges a floating point value every 100 ms can be associated with "temperature". This annotation indicates to both humans and machines that this data link provides a temperature reading.

Another M2M approach that has been proposed recently in the context of Industrie 4.0 is the Asset Administration Shell (AAS). In this model, every machine is instrumented with an AAS, which is a service that provides data and context about the machine to other machines and humans. This includes information about the machine itself and its data. The original concept of the AAS provides information about an asset's identity, type, lifecycle stage, and state. The AAS concept also provides submodels to describe the asset's aspects in different domains such as its communication, engineering, safety, security, lifecycle status, energy efficiency, health status, and process control. While the AAS and its submodels provide some semantics, these are imposed by a standard. Furthermore, any additional semantics must be encoded prior to an asset's operation. The AAS does not provide the capability for dynamically generating new submodels.

Today, the semantics of data for M2M must be explicitly "engineered", either through standard or code, which means that any change of the semantics requires inflexible and costly re-engineering.

In social media, a message is labeled with a metadata tag used to create user-generated labels for content. These tagged messages help other users find related content easily through a hyperlink property and are the basis for unmoderated and unpredictable social media discussions. To date, hyperlink tags have not been applied to machine communications due to limitations such as: (1) the tags are user-generated, and (2) responding to a tagged message requires a human-in-the-loop to first understand the tag semantics and respond to it if their content is related.

SUMMARY

System and method are provided for a scalable approach to hyperlink M2M and M2H communications on a machine social media platform. Machines are configured to generate their own executable hyperlink messages for semantic communication with content that can be self-validated. Machines can subscribe to specific message topics without human intervention by filtering on all hyperlink messages in the machine social media platform. A dashboard enables diagnostic analysis for trending hyperlink discussions.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

Systems and methods are disclosed for hyperlink messages for M2M and M2H communication. These hyperlink messages not only provide the means to associate content to metadata, but they also provide an executable specification for machines to test whether they can add their own data to the conversation. When machines generate hyperlink messages and other machines respond to the message by posting their own data, they create a discussion on a machine social media platform.

Figure 1:
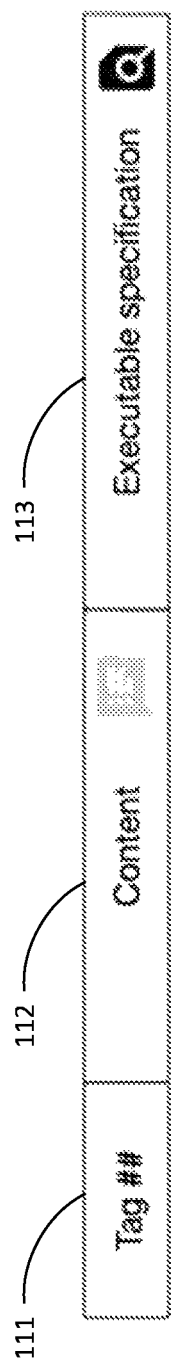
FIG. 1 shows an example of a hyperlink message format used for M2M or M2H communications in accordance with embodiments of this disclosure.

FIG. 1 shows an example of a hyperlink message format used for M2M or M2H communications in accordance with embodiments of this disclosure. In an embodiment, hyperlink message format 100 includes at least the following fields: metadata tag 101 (e.g., '##toohot') with topical text having semantic relevance to a target subject matter (e.g., machine related data such as sensed temperature) and a hyperlink symbol (e.g., such as a double hash mark '##') as defined by a machine social media platform, content field 102 containing content associated with the tag (e.g., data related to the target subject matter), and executable specification 103 which specifies a task to be executed by the machine, including one or more conditions for posting a hyperlink message.

Figure 2:
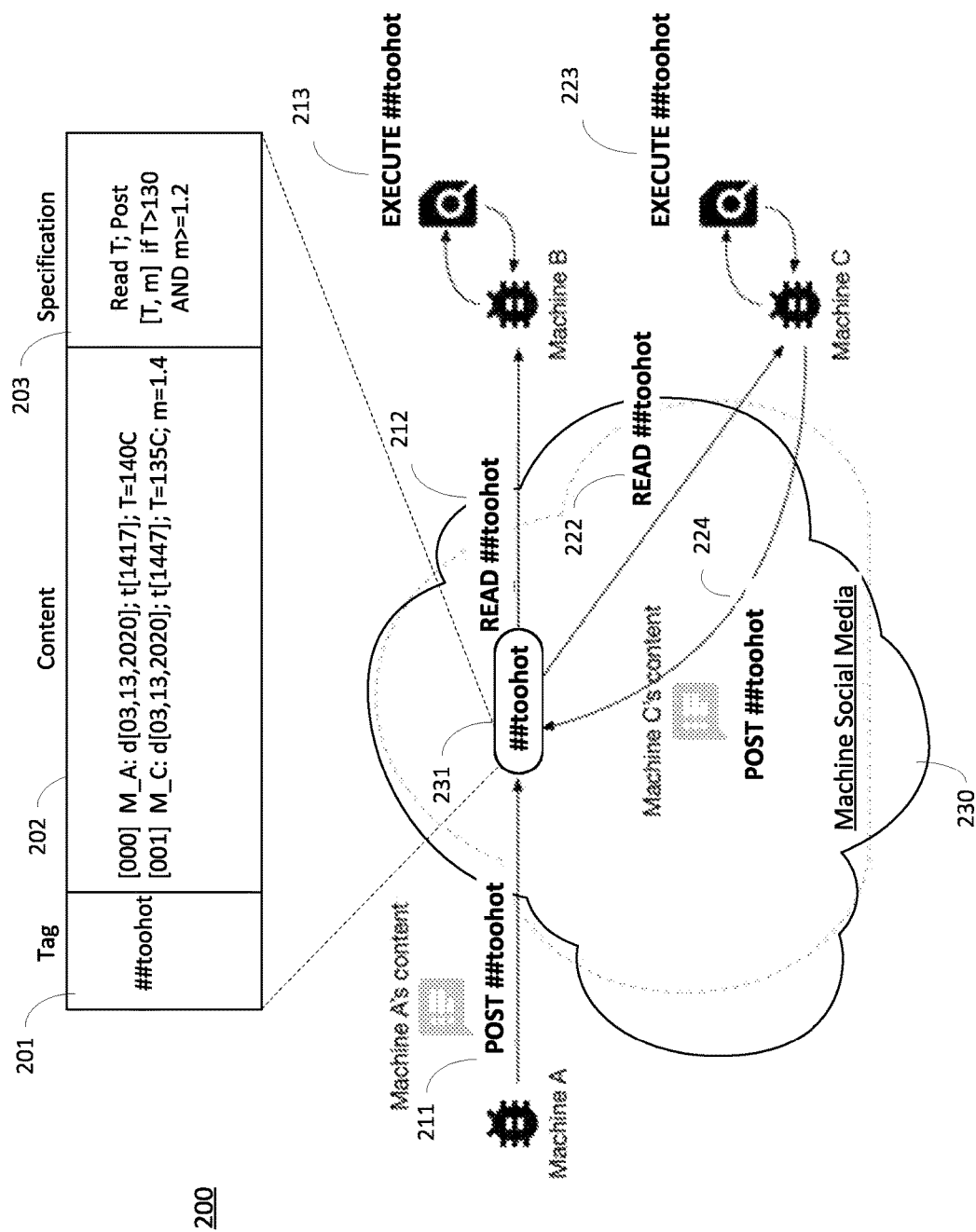
FIG. 2 shows an example for basic hyperlink message functionality in a machine social media in accordance with embodiments of this disclosure.

FIG. 2 shows an example for basic hyperlink message functionality in a machine social network in accordance with embodiments of the disclosure. In this illustrative example, a machine is recording temperature data as received from a sensor (e.g., process fluid temperature, motor temperature, or the like) and a maximum threshold constraint is exceeded. This machine, along with other participating machines, may be programmed to alert other machines through a machine social media according to rule-based criteria and implicitly request other machines to check the same variable parameter sensed in their respective locales according to the executable specification defined for a particular hyperlink message. Particular to the example shown in FIG. 2, to facilitate this communication scheme, machine social media platform 230 is configured with a server computer to register and store hyperlink message content. Here, Machine A represents the machine that has sensed a high temperature, and in response, submits a hyperlink message posting 211 with a tag 201, and content 202 that describes the temperature reading and that contains the executable specification for other machines. For this example, Machine A's posting has tag 201 "##toohot" with associated content recorded as initial entry in content field 202 indicating machine ID [M_A], date and time stamp, and a recorded temperature T=140C from an associated temperature sensor which exceeds a set threshold. Executable specification 203 is defined to instruct participating machines to measure temperature and report data results as a hyperlink message posting if the temperature variable exceeds 130 Celsius with a slope m>=1.2. Defining the specification 203 will be described below in greater detail with respect to FIG. 3.

Once hyperlink message ## toohot is posted to the machine social media platform 230 by Machine A as posting 231, it becomes visible and available for all other participating machines to read that hyperlink message posting 231. As shown in FIG. 2, the hyperlink message posting 231 on social media platform 230 is read by Machines B and C at 212, 222. Machines B and C next schedule the execution 213, 223 of the specified task locally. In an aspect, this scheduling can be based on the workload of the machine. For example, Machine B may schedule immediate execution 213 of the task immediately, workload permitting, and Machine C may schedule execution 223 of the same task a half hour later aligned with an opening in the workload task schedule. Allowing each machine to schedule execution 213, 223 avoids disruption in the industrial process being performed by the machines. In an embodiment, some executable specifications may include an urgency level to elevate prioritization for scheduling of the executable task with respect to the workload. This asynchronous and asymmetric approach for executable specification allows for a dynamic machine social media. Scheduling the executable specification locally for M2M hyperlink messages with variable execution time is analogous to human-to-human (H2H) social media postings where checking the infeed on the H2H social media by a human may occur at any point in time. In a manner likewise to Machine C, another machine, such as Machine A may read other posted hyperlink messages and schedule execution of the specification tasks according to available time slots in its workload task schedule.

In an embodiment, data results of the tasks performed according to hyperlink executable specification may be either discarded and unposted, or stored and posted to the machine social media. For example, execution 213 of the temperature reading task by Machine B does not meet the specification's criteria, and so test data results are not posted and may be discarded. Machine C, on the other hand, executes the temperature reading task 223 which meets the specification for upward trend rate (slope m>=1.2). In response to the threshold test, Machine C stores the data results for the content field and submits its own ## toohot message posting 224 with Machine C's content to machine social media platform 230 where it is recorded in the repository of hyperlink messages. The content for Machine C's posting is shown in content field 202 as entry indicating source as Machine C (M_C) with timestamp t[1447] being 30 minutes after reading Machine A's post in accordance with the scheduled execution by Machine C. The content further includes the data results of the specified task: temperature T=135C and slope m=1.4. At this point in time, the ## toohot registry 231 has accumulated two posts associated with it. Additional information may be posted for a hyperlink message posting within the content field depending on the monitoring task at hand in accordance with the specification as defined. This process continues indefinitely, accumulating content of each new post by participating machines. The timestamped hyperlink messages allow for constructing a timeline of the M2M/M2H discussion.

In an aspect, hyperlink message tags (##<label>) 111, 201 are defined with a textual label that is semantically understandable to humans in order to support both M2H and M2M social media posts. In an embodiment, tags can be created by humans, machines, or both. In case of conflicts in the tag name, for example when two or more hyperlink messages have identical tags (## toohot), then unique executable specifications 113, 203 can be used as a differentiator. For example, if executable specifications of a first hyperlink tag ## toohot (version 1) and a second hyperlink tag ## toohot (version 2) are different, then the two hyperlink messages are deemed different. Under this model, there is no restriction on who can participate in the conversation, even when they use the same hyperlink tag. In real industrial scenarios, inputs, outputs, and internal variables are different from machine to machine. This presents a problem when executing the hyperlink specifications. For example, the specification of the "temperature variable's slope m>=1.2" requires access to a temperature variable that is available to a machine. While the temperature variable may be obtained by Machine A as a sensor input, it may be available differently to Machine C as an internal variable. To overcome this problem and to provide maximum flexibility, embodiments of this disclosure match variables based on string comparisons. Determining whether two hyperlink messages with identical tags (##<label>) are truly related to the exact same subject matter is a decision for higher-level analytics operating at the machine social media platform server computer.

Figure 3:
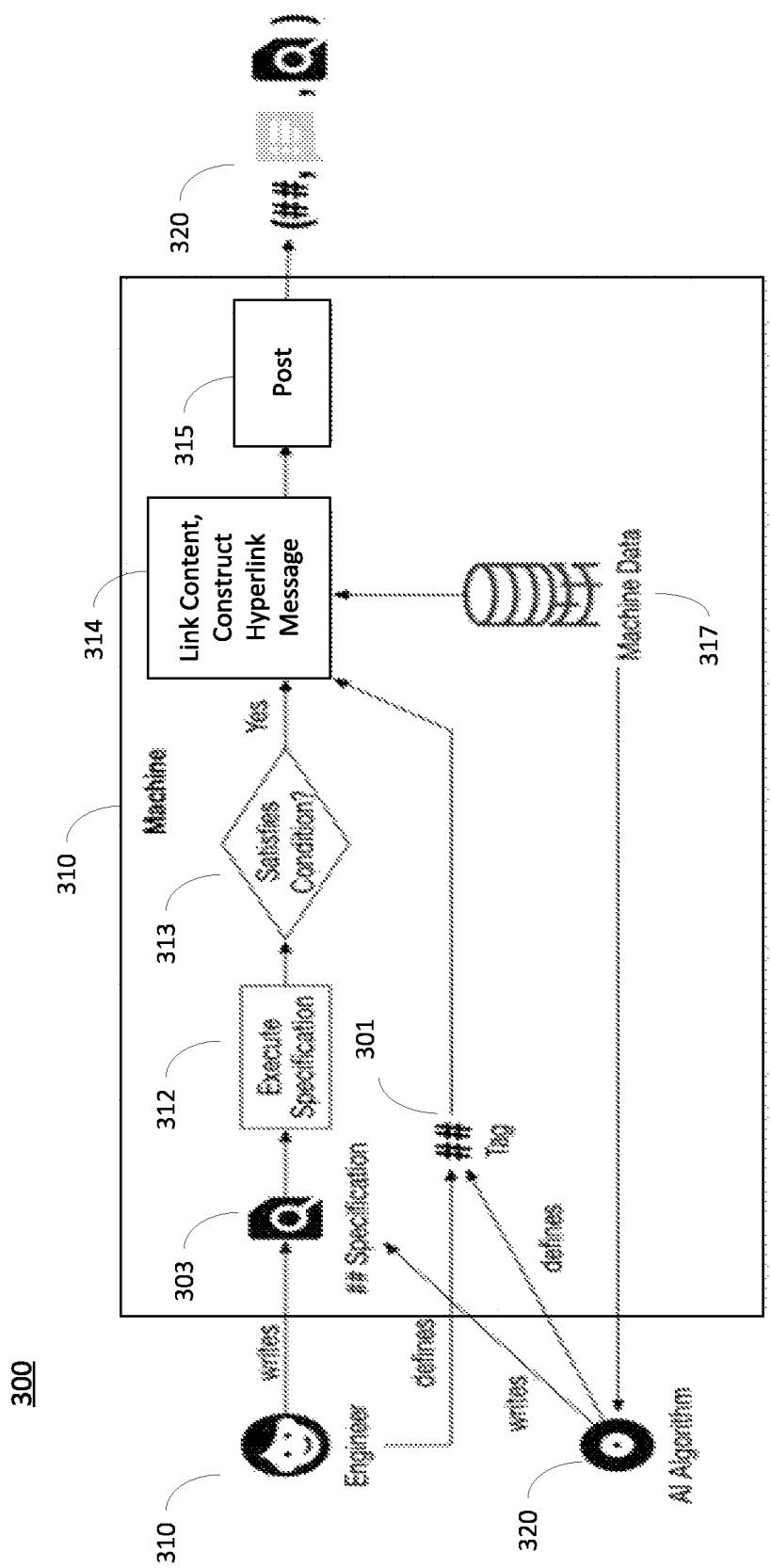
FIG. 3 shows a flow chart of an example for hyperlink posting process to machine social media in accordance with embodiments of this disclosure.

FIG. 3 shows a flow chart of an example for hyperlink posting process to machine social media in accordance with embodiments of this disclosure. In an embodiment, process 300 relates to construction of a hyperlink message with content and specification for a posting to a machine social media platform. Engineer 310 or an algorithm (e.g., AI algorithm) 320 defines the tag 301 and writes an executable specification 303, such as an instruction to perform a task to specified constraints and for posting if a condition is satisfied (e.g., reading temperature data and comparing to a threshold constraint). In an embodiment, an application programming interface (API) embedded in machine 310 local memory communicates with machine social media platform beforehand for installation of a software application which enables a user or algorithm to define hyperlink messages for posting. The executable specification 303 is executed (step 312) in machine 310 by reading machine data 317 as specified in specification 303 (e.g., temperature variable data of a particular sensor or internal variable as specified). Machine data 317 may be stored locally or remotely. If conditions are satisfied according to specification 303 (step 313), the data result content is linked to the associated tag 301 and specification 303 and a hyperlink message is constructed (step 314) by writing tag, content and specification to respective fields as described for FIG. 1. The hyperlink message 320 can then be posted (step 315) to the machine social media. Validation is presumed by self-validation as hyperlink messages are defined on a machine that must successfully execute the specified task and posts only if successfully executed.

Figure 4:
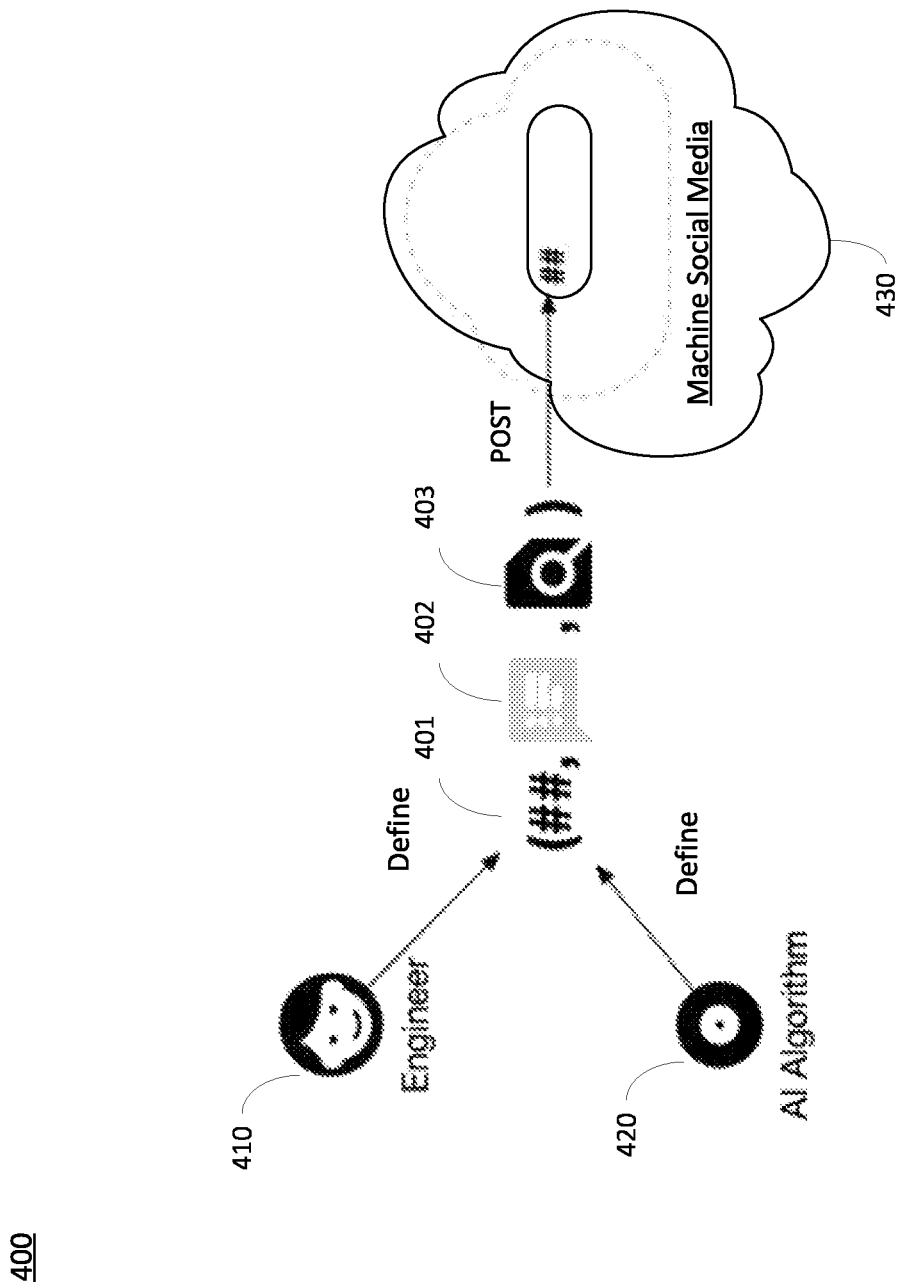
FIG. 4 shows a flow chart of an example for direct hyperlink message posting to machine social media without testing in accordance with embodiments of this disclosure.

FIG. 4 shows a flow chart of an example for direct hyperlink message posting to machine social media without testing in accordance with embodiments of this disclosure. Here, the defining and posting of a hyperlink message, including tag 401, content 402 and specification 403 can be defined generically and posted directly to the machine social media platform 430 by engineer 410 or algorithm (e.g., AI algorithm) 420. This, however, does not provide any guarantees of successful execution because it was never tested before deployment.

Figure 5:
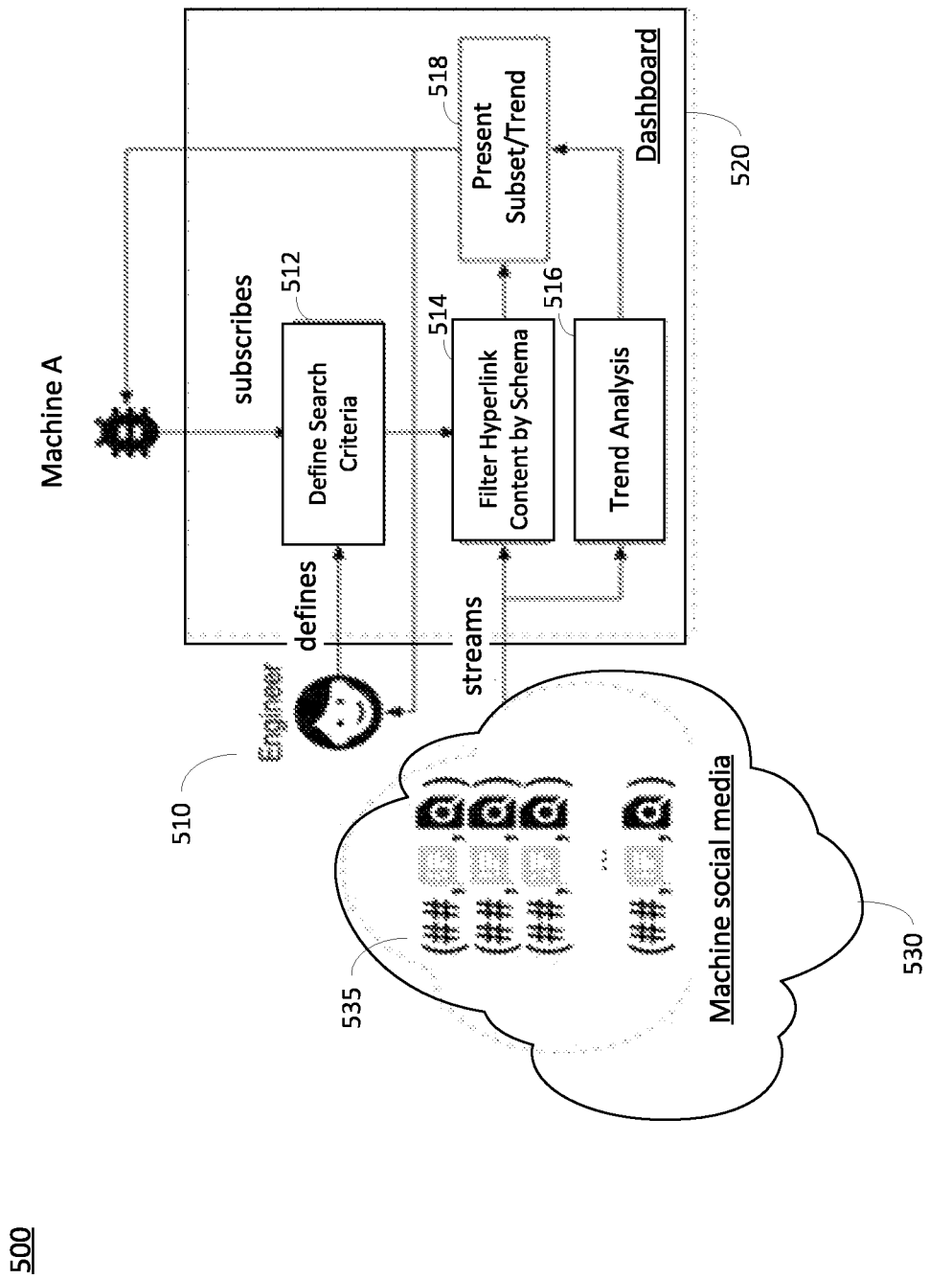
FIG. 5 shows an example of data flow for a dashboard in accordance with embodiments of this disclosure.

FIG. 5 shows an example of data flow for a dashboard in accordance with embodiments of this disclosure. In an embodiment, a dashboard component 520 comprises algorithmic modules to analyze the hyperlink message postings 535 on the machine social media platform 530. The dashboard 520 can be used by either users or machines for subscribing to particular topics for capturing machine M2M or M2H discussions on those topics, or for subscribing to a specific machine to monitor its M2M or M2H discussions. In the case of human users 510, may subscribe by defining search criteria 512 according to what categories of posts are of interest. For example, a graphical user interface module is configured to prompt a user for search criteria and to receive the user input. In the case of machines, a machine can subscribe to specific interests. As shown, Machine A subscribes by defining search criteria 512. These criteria are then applied to the stream of hyperlink message postings 535 from machine social media platform 530 using a filter module to filter posted content by a defined schema 514 to generate a subset that matches the criteria. Using a data presentation module, this subset is then presented back to the subscribed user (e.g., engineer) at 518 and the machines that subscribed to the corresponding criteria, including Machine A. The system supports multiple filters simultaneously and these are treated independently to be able to serve multiple users and multiple machines. From the subset of hyperlink messages, user 518 or Machine A may execute the hyperlink reading and posting processes 200 or 400.

Trend analysis 516 is a feature that indicates, for example, whenever a hyperlink discussion starts trending. In an embodiment, dashboard 520 is configured to detect a level of activity for any of the hyperlink message postings 535 exceeds a threshold indicating a trending topic (e.g., multiple machines posting the trending hyperlink within a defined time window). This is useful in factory management for monitoring and early detection of machine or process faults or declining performance. The detected trend is presented at 518 to the user 510 or machine subscriber such as Machine A, prompting investigation or inspection of machines involved in the trending hyperlink discussion to diagnose a potential event requiring remedial action. This is a powerful tool for industrial diagnostics.

Figure 6:
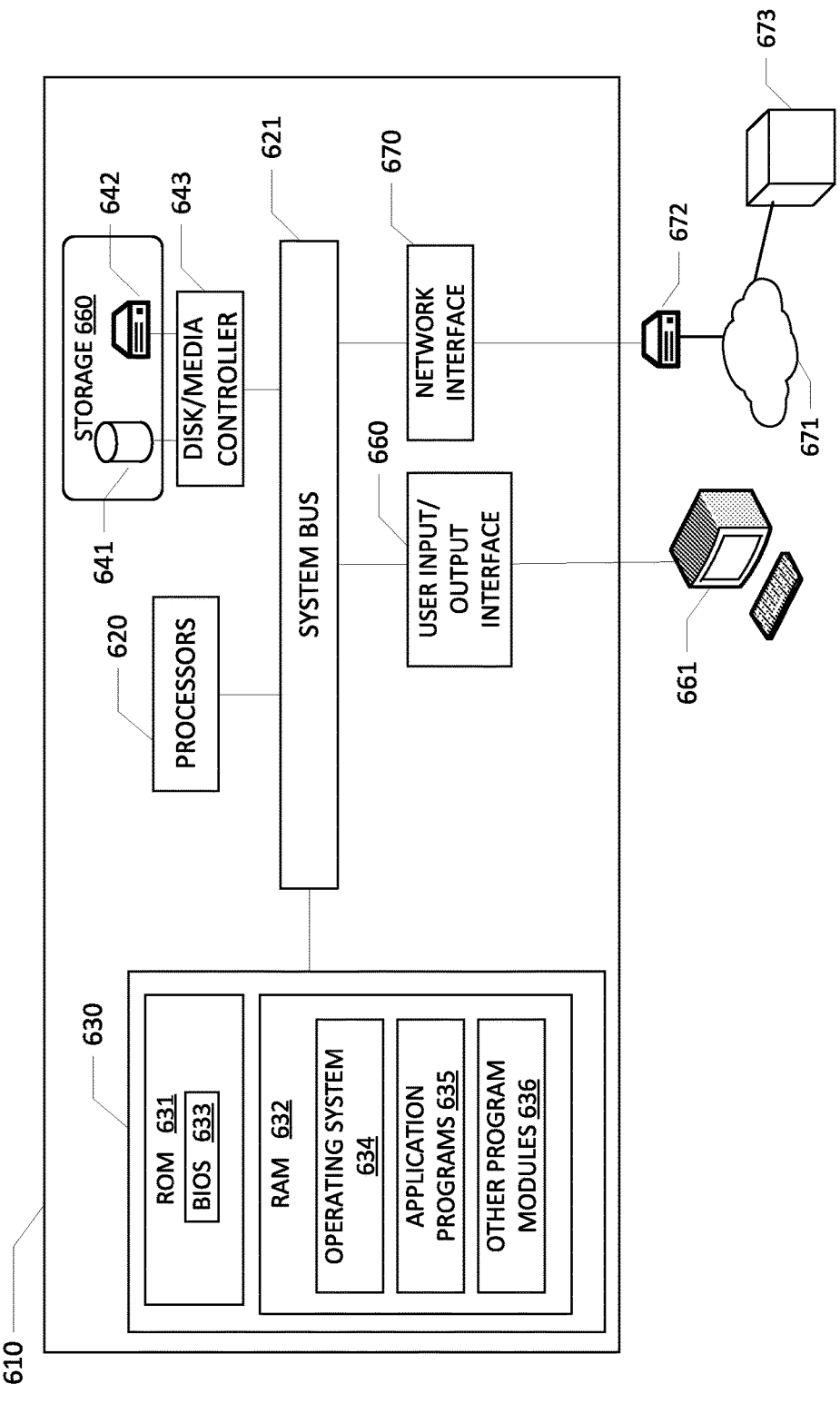
FIG. 6 illustrates an example of a computing environment within which embodiments of the present disclosure may be implemented.

FIG. 6 illustrates an example of a computing environment within which embodiments of the present disclosure may be implemented. A computing environment 600 includes a computer system 610 that may include a communication mechanism such as a system bus 621 or other communication mechanism for communicating information within the computer system 610. The computer system 610 further includes one or more processors 620 coupled with the system bus 621 for processing the information. In an embodiment, computing environment 600 corresponds to a system for machine social media platform communications, in which the computer system 610 relates to a computer described below in greater detail.

The processors 620 may include one or more central processing units (CPUs), graphical processing units (CPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 620 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 621 may include at least one of a system bus, a memory bus, an address bus, or a message bus, and may permit exchange of information (e.g., data (including computer-executable code), signaling, etc.) between various components of the computer system 610. The system bus 621 may include, without limitation, a memory bus or a memory controller, a peripheral bus, an accelerated graphics port, and so forth. The system bus 621 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 6, the computer system 610 may also include a system memory 630 coupled to the system bus 621 for storing information and instructions to be executed by processors 620. The system memory 630 may include computer readable storage media in the form of volatile and/or nonvolatile memory, such as read only memory (ROM) 631 and/or random access memory (RAM) 632. The RAM 632 may include other dynamic storage device(s) (e.g., dynamic RAM, static RAM, and synchronous DRAM). The ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system 633 (BIOS) containing the basic routines that help to transfer information between elements within computer system 610, such as during start-up, may be stored in the ROM 631. RAM 632 may contain data and/or program modules that are immediately accessible to and/or presently being operated on by the processors 620. System memory 630 additionally includes modules for executing the described embodiments. System memory 630 may additionally include, for example, operating system 634, application modules 635, and other program modules 636. Application modules 635 may include the aforementioned application for defining tags and specifications for hyperlink messages and may also include a user portal for development of the application program, allowing input parameters to be entered and modified as necessary.

The operating system 634 may be loaded into the memory 630 and may provide an interface between other application software executing on the computer system 610 and hardware resources of the computer system 610. More specifically, the operating system 634 may include a set of computer-executable instructions for managing hardware resources of the computer system 610 and for providing common services to other application programs (e.g., managing memory allocation among various application programs). In certain example embodiments, the operating system 634 may control execution of one or more of the program modules depicted as being stored in the data storage 640. The operating system 634 may include any operating system now known or which may be developed in the future including, but not limited to, any server operating system, any mainframe operating system, or any other proprietary or non-proprietary operating system.

The computer system 610 may also include a disk/media controller 643 coupled to the system bus 621 to control one or more storage devices for storing information and instructions, such as a magnetic hard disk 641 and/or a removable media drive 642 (e.g., floppy disk drive, compact disc drive, tape drive, flash drive, and/or solid state drive). Storage devices 640 may be added to the computer system 610 using an appropriate device interface (e.g., a small computer system interface (SCSI), integrated device electronics (IDE), Universal Serial Bus (USB), or FireVVire). Storage devices 641, 642 may be external to the computer system 610.

The computer system 610 may include a user input interface 660 for communication with a graphical user interface (GUI) 661, which may comprise one or more input/output devices, such as a keyboard, touchscreen, tablet and/or a pointing device, for interacting with a computer user and providing information to the processors 620, and a display screen or monitor. In an aspect, the GUI 661 relates to a dashboard display for presenting subsets or trends of hyperlink postings as earlier described.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium of storage 640, such as the magnetic hard disk 641 or the removable media drive 642. The magnetic hard disk 641 and/or removable media drive 642 may contain one or more data stores and data files used by embodiments of the present disclosure. The data store 640 may include, but are not limited to, databases (e.g., relational, object-oriented, etc.), file systems, flat files, distributed data stores in which data is stored on more than one node of a computer network, peer-to-peer network data stores, or the like. Data store contents and data files may be encrypted to improve security. The processors 620 may also be employed in a multi-processing arrangement to execute the one or more sequences of instructions contained in system memory 630. In alternative embodiments, hard-wired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any medium that participates in providing instructions to the processors 620 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 641 or removable media drive 642. Non-limiting examples of volatile media include dynamic memory, such as system memory 630. Non-limiting examples of transmission media include coaxial cables, copper wire, and fiber optics, including the wires that make up the system bus 621. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. Each block of the flowchart illustrations and/or block diagrams, and combinations of blocks in the flowchart illustrations and/or block diagrams, may be implemented by computer readable medium instructions.

The computing environment 600 may further include the computer system 610 operating in a networked environment using logical connections to one or more remote computers, such as remote computing device 673. The network interface 670 may enable communication, for example, with other remote devices 673 or systems and/or the storage devices 641, 642 via the network 671. Remote computing device 673 may be a personal computer (laptop or desktop), a mobile device, a server, a router, a network PC, a peer device or other common network node, and typically includes many or all of the elements described above relative to computer system 610. When used in a networking environment, computer system 610 may include modem 672 for establishing communications over a network 671, such as the Internet. Modem 672 may be connected to system bus 621 via user network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computing device 673). The network 671 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671.

It should be appreciated that the program modules, applications, computer-executable instructions, code, or the like depicted in FIG. 6 as being stored in the system memory 630 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 610, the remote device 673, and/or hosted on other computing device(s) accessible via one or more of the network(s) 671, may be provided to support functionality provided by the program modules, applications, or computer-executable code depicted in FIG. 6 and/or additional or alternate functionality. Further, functionality may be modularized differently such that processing described as being supported collectively by the collection of program modules depicted in FIG. 6 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 6 may be implemented, at least partially, in hardware and/or firmware across any number of devices.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A machine configured to execute hyperlink message discussion using a machine social media platform, comprising:
    a processor, and a memory having executable instructions stored thereon to:
    construct a hyperlink message for machine-to-machine (M2M) or machine-to-human (M2H) communication, the message formatted to comprise at least the following fields: a tag field having a semantic metadata tag, a content field having content associated with the tag, and a specification field having an executable specification, wherein the constructing comprises:
        define, by an artificial intelligence (AI) algorithm, the metadata tag with semantic text and a hyperlink symbol;
        define, by an artificial intelligence (AI) algorithm, the executable specification for machine related data with instructions to a machine to: (1) perform a task associated with the machine related data, and (2) post to the machine social media platform data results of the task as content for the hyperlink message, wherein the specification includes one or more conditions for posting the hyperlink message;
    perform, by the machine, the task of the executable specification;

link, in response to satisfying the one or more conditions, the content to the associated tag and specification, the content including the data results of the task;
write the tag, the content and the specification to the tag field, the content field and the specific field, respectively; and
post, by the machine, the hyperlink message to the machine social media platform, wherein the hyperlink message posting is visible and available to other participating machines on the machine social media platform to read and contribute related content as a hyperlink discussion of M2M or M2H communication.

2. The machine of claim 1, further configured to:
read a posted hyperlink message on the machine social media platform;
schedule execution of the specification associated with the posted hyperlink message for a later time that aligns with an available time slot in a workload task schedule for the machine.

3. The machine of claim 1, further configured to:
post hyperlink message content to the machine social media platform, wherein the posted hyperlink message content is timestamped.

4. The machine of claim 1, further configured to:
read a plurality of hyperlink messages posted on the machine social media platform; and
use unique specifications as a differentiator between two or more hyperlink messages having identical tags and deeming respective hyperlink messages as different if having unique specifications.

5. The machine of claim 1, further configured to:
use string comparisons to match variables of the specifications to variables available to the machine.

6. The machine of claim 1, further configured to:
subscribe to specific interests by defining search criteria; and
receive a subset of hyperlink messages filtered to the search criteria.

7. The machine of claim 1, further configured to:
receive a trending topic from a dashboard wherein the trending topic relates to a detected level of activity for any one of a plurality of hyperlink message postings within a defined time window.

8. A method for hyperlink message discussion using a machine social media platform, comprising:
constructing a hyperlink message for machine-to-machine (M2M) or machine-to-human (M2H) communication, the message formatted to comprise at least the following fields: a tag field having a semantic metadata tag, a content field having content associated with the tag, and a specification field having an executable specification, wherein the constructing comprises:
defining, by an artificial intelligence (AI) algorithm, the metadata tag with semantic text and a hyperlink symbol;
defining, by an artificial intelligence (AI) algorithm, the executable specification for machine related data with instructions to a machine to: (1) perform a task associated with the machine related data, and (2) post to the machine social media platform results of the task as content for the hyperlink message, wherein the specification includes one or more conditions for posting the hyperlink message;
performing, by the machine, the task of the executable specification;
linking, in response to satisfying the one or more conditions, the content to the associated tag and specification;
wherein the constructing further comprises writing the tag, the content and the specification to the tag field, the content field and the specific field, respectively; and
posting, by the machine, the hyperlink message to the machine social media platform, wherein the hyperlink message posting is visible and available to other participating machines on the machine social media platform to read and contribute related content as a hyperlink discussion of M2M or M2H communication.

9. The method of claim 8, further comprising:
reading a posted hyperlink message on the machine social media platform;
scheduling execution of the specification associated with the posted hyperlink message for a later time that aligns with an available time slot in a workload task schedule for the machine.

10. The method of claim 8, further comprising:
accumulating, by the social media platform, posted hyperlink message content in a repository, wherein each posted hyperlink message content is timestamped to construct a timeline of the discussion.

11. The method of claim 8, further comprising:
using unique specifications as a differentiator between two or more hyperlink messages having identical tags and deeming respective hyperlink messages as different if having unique specifications.

12. The method of claim 8, further comprising:
using string comparisons to match variables of the specifications to variables available to the machine.

13. The method of claim 8, further comprising:
subscribing, by the machine, to specific interests by defining search criteria; and
filtering content from a stream of hyperlink message postings by a defined schema to generate a subset of hyperlink messages matched to the search criteria.

14. The method of claim 8, further comprising:
filtering content from a stream of hyperlink message postings by a defined schema to generate a subset of hyperlink messages matched to the search criteria; and
presenting the subset of hyperlink messages to a subscribed user.

15. The method of claim 8, further comprising:
receiving a stream of hyperlink messages;
detecting a level of activity for any one of a plurality of hyperlink message postings within a defined time window; and
presenting the activity as a trending topic on a dashboard on a condition that the activity exceeds a threshold.

* * * * *